(12) United States Patent  (10) Patent No.: US 8,156,546 B2
Varadarajan et al.  (45) Date of Patent: Apr. 10, 2012

(54) SYSTEM AND METHOD FOR FLYING SQUAD RE AUTHENTICATION OF ENTERPRISE USERS

(75) Inventors: Sridhar Varadarajan, Bangalore (IN); Srividya Gopalan, Bangalore (IN)

(73) Assignee: Satyam Computer Services Limited of Mayfair Centre, Secunderabad (IN)

( * ) Notice: Subject to any disclaimer, the term of this patent is extended or adjusted under 35 U.S.C. 154(b) by 338 days.

(21) Appl. No.: 12/608,255

(22) Filed: Oct. 29, 2009

(65) Prior Publication Data

US 2011/0107090 A1  May 5, 2011

(51) Int. Cl.
*G06F 15/16* (2006.01)
*G06F 7/04* (2006.01)

(52) U.S. Cl. ............................................... 726/4; 726/3
(58) Field of Classification Search .................. 726/3
See application file for complete search history.

(56) References Cited

U.S. PATENT DOCUMENTS

| | | | |
|---|---|---|---|
| 7,353,383 | B2 | 4/2008 | Skingle |
| 7,496,755 | B2 | 2/2009 | Genty et al. |
| 2007/0277231 | A1 | 11/2007 | Medvinsky et al. |
| 2007/0294752 | A1 | 12/2007 | Kinser et al. |
| 2008/0005037 | A1 | 1/2008 | Hammad et al. |
| 2008/0120698 | A1* | 5/2008 | Ramia ................................ 726/4 |
| 2008/0159534 | A1 | 7/2008 | Rager et al. |
| 2008/0201766 | A1* | 8/2008 | Amirov et al. ..................... 726/4 |

OTHER PUBLICATIONS

Boyd, David J., "Single Sign-On to the Web with an EMV Card", IEEE, Apr. 2008, pp. 112-120.
Brasee et al., "A Secure Two-Factor Authentication Scheme For Single Sign-On Services", Security Comm. Networks (2008); published online in Wiley InterScience, www.interscience.wiley.com, DOI: 10.1002/sec.36.
June et al., "JSON Based Decentralized SSO Security Architecture in E-Commerce", appeared in International Symposium on Electronic Commerce and Security, Aug. 3-5, 2008, pp. 471-475, DOI 10.1109/ISECS.2008.171.

* cited by examiner

*Primary Examiner* — Philip Chea
(74) *Attorney, Agent, or Firm* — Merek, Blackmon & Voorhees, LLC

(57) ABSTRACT

Enterprise users access several applications and services routinely to carry out their work-related activities on a day-to-day basis. These applications and services could be hosted within an enterprise or on a third-party data center. The enterprise users login into the applications and services so as to gain access to the applications and services. In the case of single sign-on, it is expected that the users authenticate once to a specific application/service/system and obtain access to any other application/service/system. In such a scenario, it is important to ensure that during the course of this authenticated access grant, the right users are provided access to right information. This is achieved by a re-authentication system that demands minimum re-authentication effort from "right" users and maximum re-authentication effort from "non-right" users. A system and method of on the fly re-authentication involves a novel challenge-response mechanism.

30 Claims, 13 Drawing Sheets

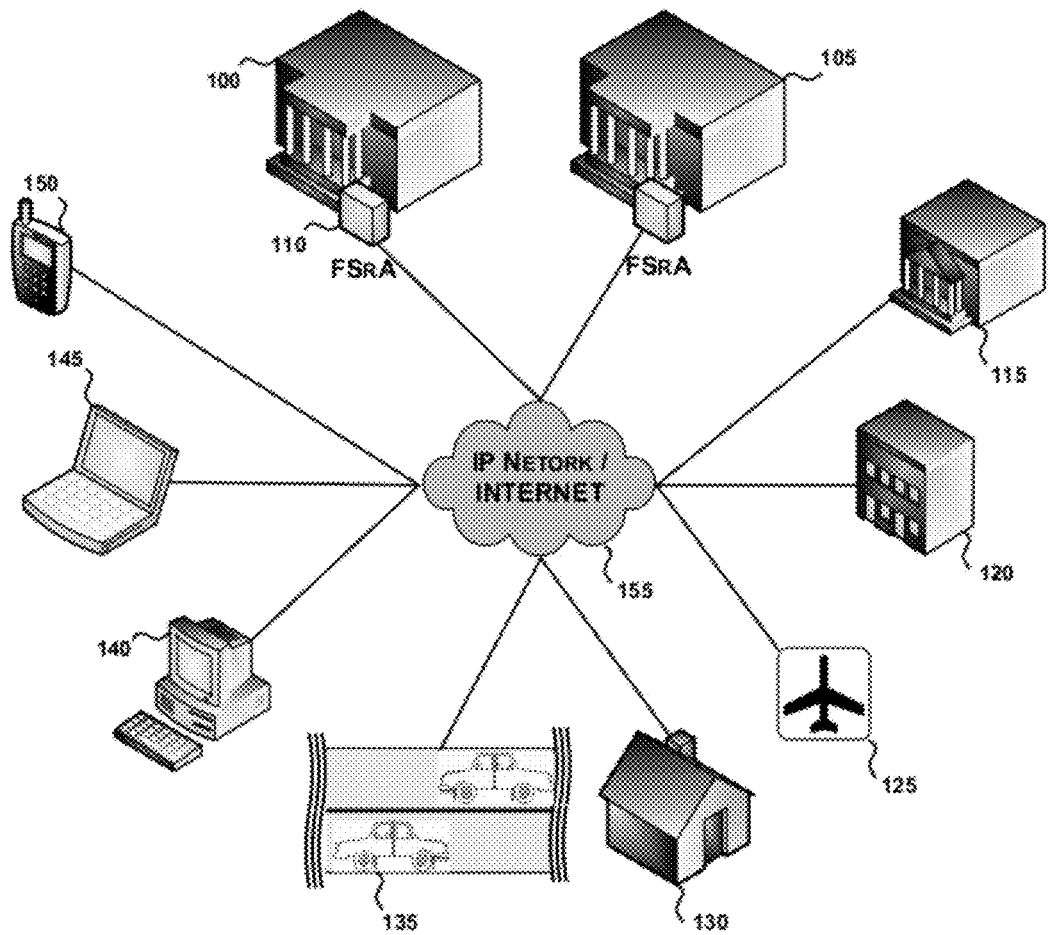
FIG. 1: AN ILLUSTRATIVE NETWORKING ENVIRONMENT OF FSRA SYSTEM

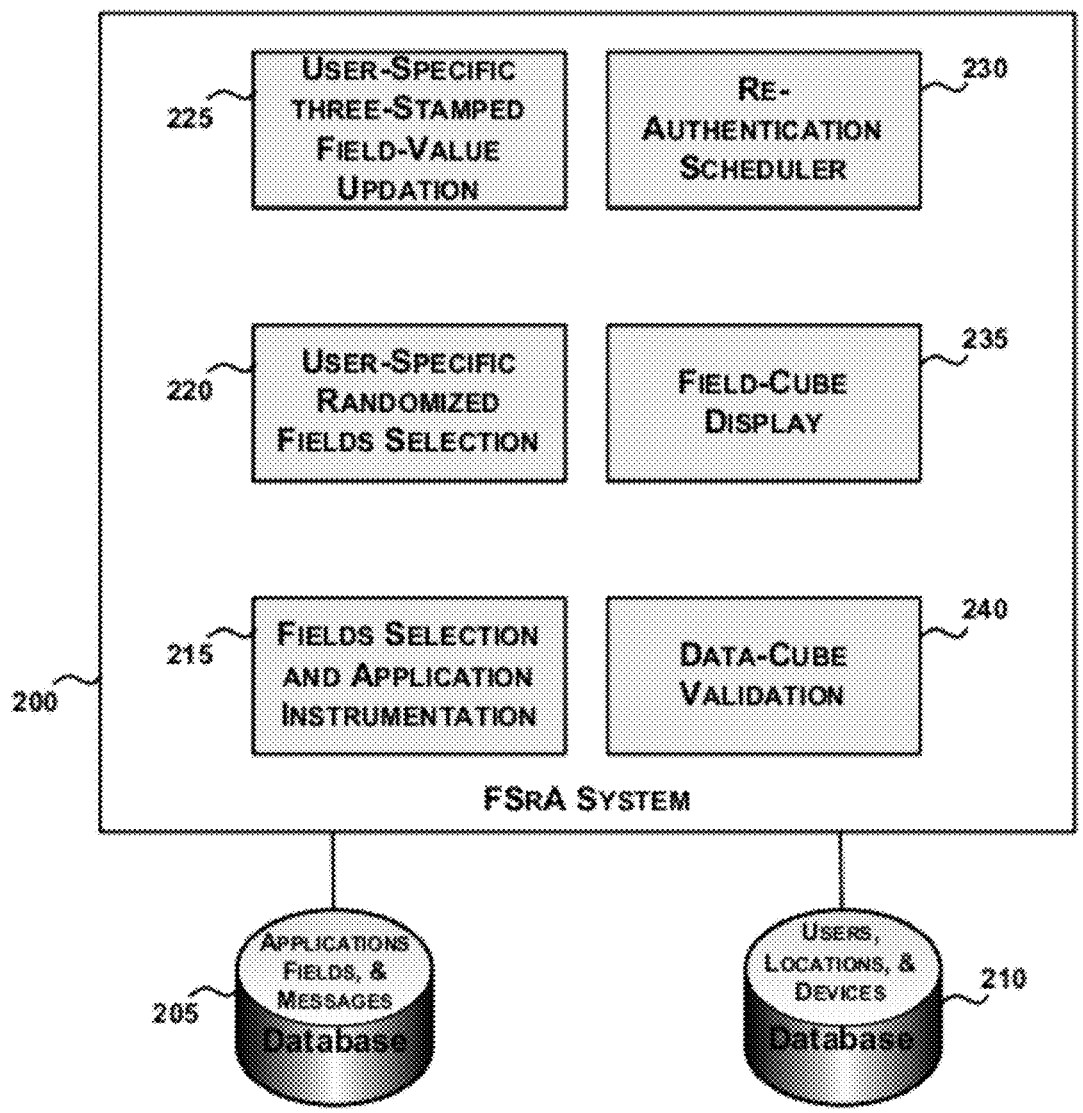
FIG. 2: OVERVIEW OF FSRA SYSTEM

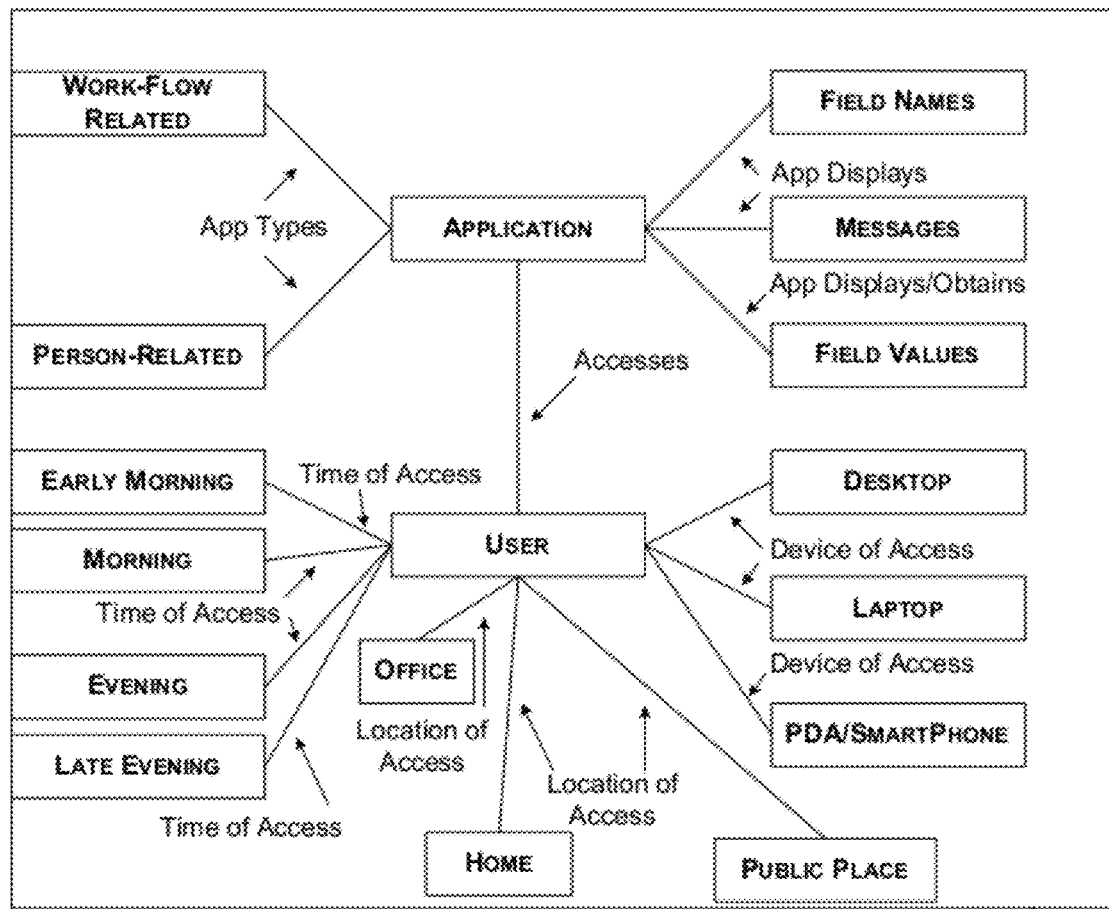
FIG. 2A: FSRA S-ENTITIES AND S-DIMENSIONS

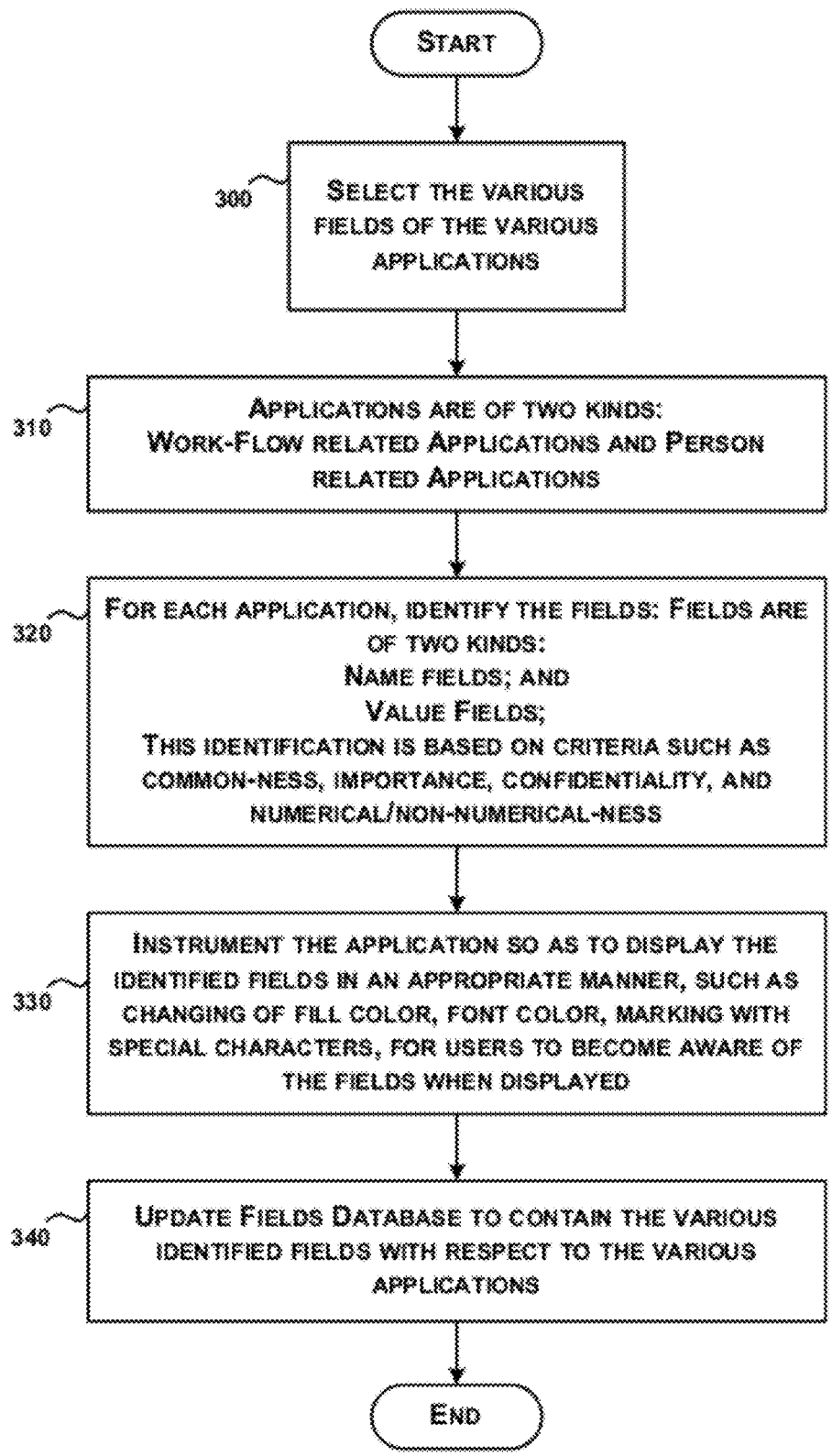
FIG. 3: AN APPROACH FOR APPLICATION-WISE FIELD SELECTION

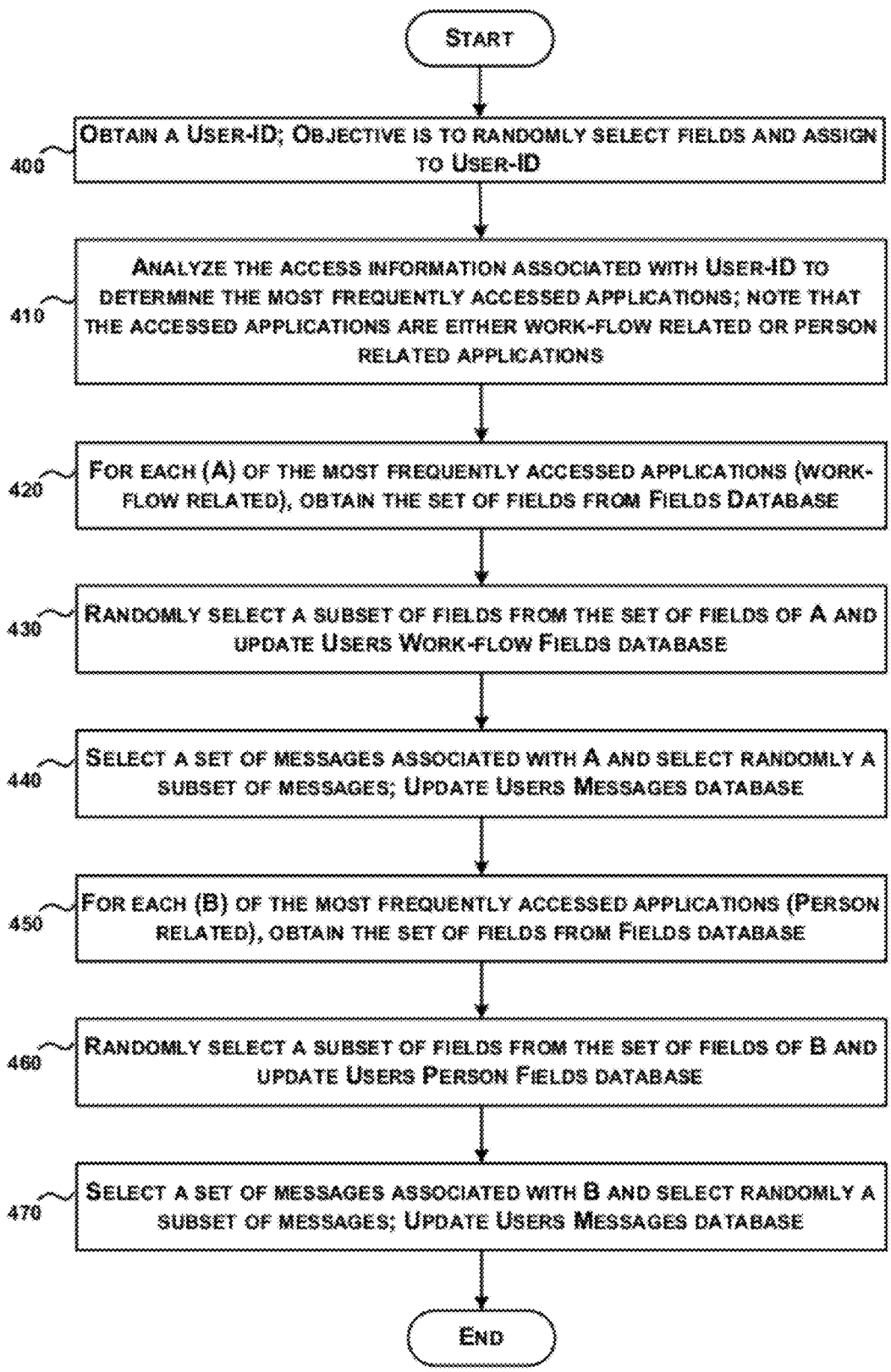
FIG. 4: AN APPROACH FOR USER-SPECIFIC FIELD SELECTION

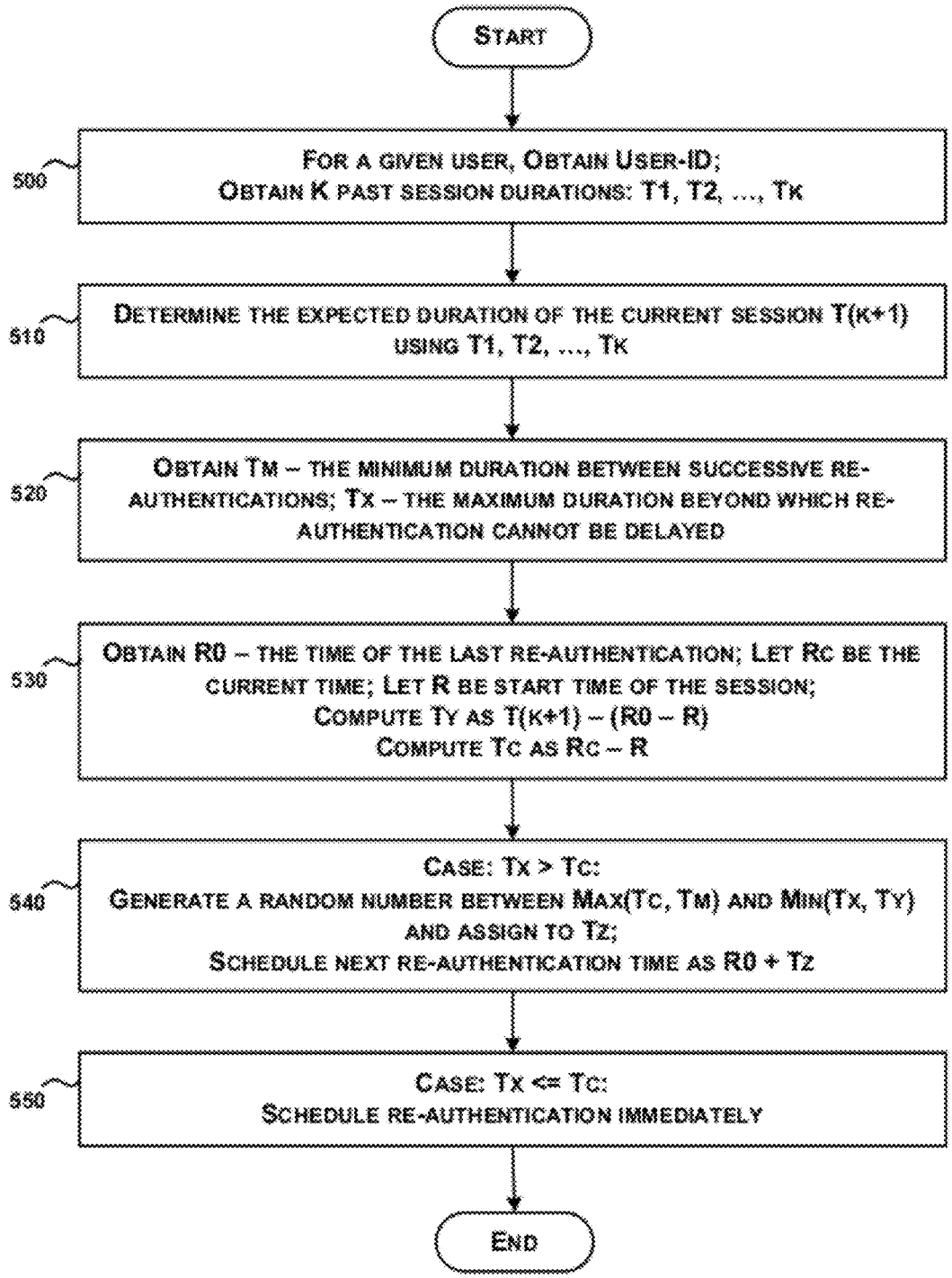
FIG. 5: AN APPROACH FOR RE-AUTHENTICATION SCHEDULING

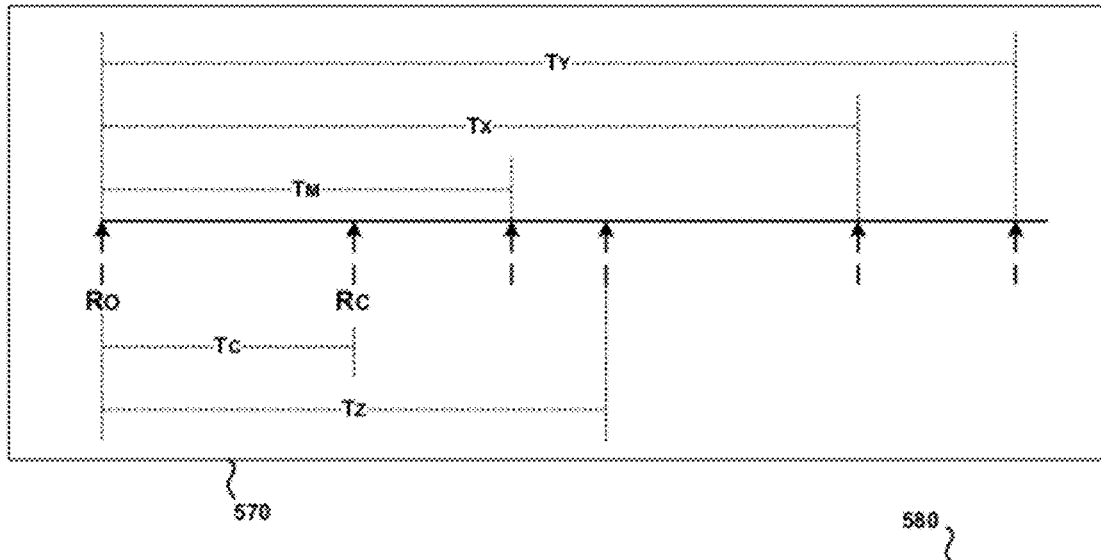

NOTATION:

Ro: TIME OF LAST RE-AUTHENTICATION;
Rc: CURRENT TIME;

Tc: ELAPSED TIME SINCE LAST RE-AUTHENTICATION;
Tm: MINIMUM TIME TO BE ELAPSED FOR NEXT RE-AUTHENTICATION;
Tx: MAXIMUM ELAPSED TIME BEFORE WHICH RE-AUTHENTICATION SHOULD HAPPEN;
Ty: ELAPSED TIME BY WHICH THE SESSION IS EXPECTED TO END;
Tz: ELAPSED TIME BEFORE THE SCHEDULED NEXT RE-AUTHENTICATION;

CASE $T_m > T_c$ AND $T_y > T_x$:
    GENERATE A RANDOM NUMBER BETWEEN $T_m$ AND $T_x$ TO DETERMINE $T_z$;

CASE $T_m <= T_c$ AND $T_y > T_x$:
    GENERATE A RANDOM NUMBER BETWEEN $T_c$ AND $T_x$ TO DETERMINE $T_z$;

CASE $T_m > T_c$ AND $T_y <= T_x$:
    GENERATE A RANDOM NUMBER BETWEEN $T_m$ AND $T_y$ TO DETERMINE $T_z$;

CASE $T_m <= T_c$ AND $T_y <= T_x$:
    GENERATE A RANDOM NUMBER BETWEEN $T_c$ AND $T_y$ TO DETERMINE $T_z$;

CASE $T_x <= T_c$:
    SCHEDULE RE-AUTHENTICATION IMMEDIATELY;

FIG. 5A: ILLUSTRATIVE NOTATIONS AND RE-AUTHENTICATION TIME COMPUTATION

OVERALL RE-AUTHENTICATION PROCEDURE

1. INSTRUMENT APPLICATIONS SO THAT CERTAIN RANDOMLY SELECTED FIELDS GET DISPLAYED HIGHLIGHTED; NOTE THERE ARE TWO KINDS OF APPLICATIONS: (A) WORK-FLOW RELATED; AND (B) PERSON RELATED;

2. DURING A SESSION OF A PARTICULAR USER, HIGHLIGHT A RANDOMLY SELECTED USER-SPECIFIC FIELDS AND/OR MESSAGES RELATED TO THE APPLICATION / SYSTEM BEING INTERACTED WITH; OBTAIN THE USER'S RESPONSE;

3. STORE THE HIGHLIGHTED FIELD INFORMATION: NAME, VALUE, TIMESTAMP, LOCATIONSTAMP, DEVICESTAMP; ASSOCIATE A RANDOMLY GENERATED TTL (TIME TO LIVE) WITH EACH FIELD INFORMATION. COLLECT AS MUCH SUCH INFORMATION AS POSSIBLE DURING A SESSION; NOTE THAT THERE ARE TWO KINDS OF INFORMATION THAT GETS HIGHLIGHTED WHILE DISPLAYED ON SCREEN: (A) FIELD NAMES AND VALUES; AND (B) MESSAGES;

4. THIS RESULTS IN THE FOLLOWING FOR EACH USER:

| TABLE W: W3-INFO | TABLE P: P3-INFO | TABLE M: M3-INFO |
|---|---|---|
| | | |
| | | |
| | | |
| | | |
| | | |

NOTE THAT TABLE W CONTAINS HIGHLIGHTED WORKFLOW-RELATED THREE-STAMPED FIELD NAMES AND VALUES; TABLE P CONTAINS HIGHLIGHTED PERSON-RELATED THREE-STAMPED FIELD NAMES AND VALUES; AND TABLE M CONTAINS HIGHLIGHTED APPLICATION-RELATED AND SYSTEM-RELATED MESSAGES; ADDITIONALLY, TABLE M ALSO CONTAINS AN EQUAL NUMBER OF APPLICATION-RELATED AND SYSTEM-RELATED MESSAGES THAT DID NOT GET DISPLAYED.

5. DETERMINE THE NEXT RE-AUTHENTICATION TIME POINT; DETERMINE A RANDOM NUMBER $W_r$ OF W-ENTITIES (WITHIN W-MIN AND W-MAX BOUNDS) AND SELECT $W_r$ ENTITIES FROM TABLE W; SIMILARLY, DETERMINE A RANDOM NUMBER $P_r$ OF P-ENTITIES (WITHIN P-MIN AND P-MAX BOUNDS) AND SELECT $P_r$ ENTITIES FROM TABLE P; DETERMINE A RANDOM NUMBER $M_r$ OF M-ENTITIES (WITHIN M-MIN AND M-MAX BOUNDS) AND SELECT $M_r$ ENTITIES FROM TABLE M; NOTE THAT S-ENTITIES COMPRISE OF W-ENTITIES, P-ENTITIES, AND M-ENTITIES;

6. RANDOMLY SELECT A DISPLAY MODEL; NOTE THAT THERE ARE FOUR KINDS: POINT DISPLAY MODEL, LINE DISPLAY MODEL, PLANE DISPLAY MODEL, AND CUBE DISPLAY MODEL;

7. BASED ON SELECTED DISPLAY MODEL, DISPLAY $W_r$, $P_r$, AND $M_r$ ENTITIES, AND OBTAIN THE USER FEEDBACK;

8. EVALUATE THE USER FEEDBACK; LOG THE EVALUATION RESULT; AND TAKE AN APPROPRIATE ACTION SUCH AS ALLOWING OF THE SESSION TO CONTINUE OR ABORTING OF THE SESSION.

FIG. 6: OVERALL RE-AUTHENTICATION PROCEDURE

| TABLE-W: W3-INFO | | | | |
|---|---|---|---|---|
| TIMESTAMP | LOCATIONSTAMP | DEVICESTAMP | NAME | VALUE |
| EVENING | OFFICE | DESKTOP | PO DATE | 9-APR-09 |
| EVENING | OFFICE | DESKTOP | SO NUMBER | 982-3451 |
| LATEEVENING | HOME | LAPTOP | PO VALUE | OK |
| LATEEVENING | HOME | LAPTOP | CUSTOMER CONTACT | JOHN |
| MORNING | PUBLICPLACE | LAPTOP | PO NUMBER | 127-7764 |

600

| TABLE-P: P3-INFO | | | | |
|---|---|---|---|---|
| TIMESTAMP | LOCATIONSTAMP | DEVICESTAMP | NAME | VALUE |
| MORNING | OFFICE | DESKTOP | MANAGER | BOB |
| MORNING | OFFICE | LAPTOP | TRAVEL PLAN | TP-097 |
| EVENING | PUBLICPLACE | LAPTOP | ROLE | LEAD |
| LATEEVENING | HOME | LAPTOP | LEAVEINFO | OK |
| LATEEVENING | HOME | LAPTOP | RESOURCE | HS-058 |

610

| TABLE-M: M3-INFO | | | | |
|---|---|---|---|---|
| TIMESTAMP | LOCATIONSTAMP | DEVICESTAMP | NAME | VALUE |
| EVENING | OFFICE | DESKTOP | INCORRECT ORDER # | OK |
| EVENING | OFFICE | DESKTOP | SUCCESSFUL UPDATION | NO |
| LATEEVENING | OFFICE | DESKTOP | NO SUCH PO | OK |
| LATEEVENING | OFFICE | DESKTOP | PR RECORD UPDATED | NO |
| LATEEVENING | HOME | LAPTOP | INSUFFICIENT RESOURCES | OK |

620

FIG. 6A: ILLUSTRATIVE W3-INFO, P3-INFO, AND M3-INFO TABLES

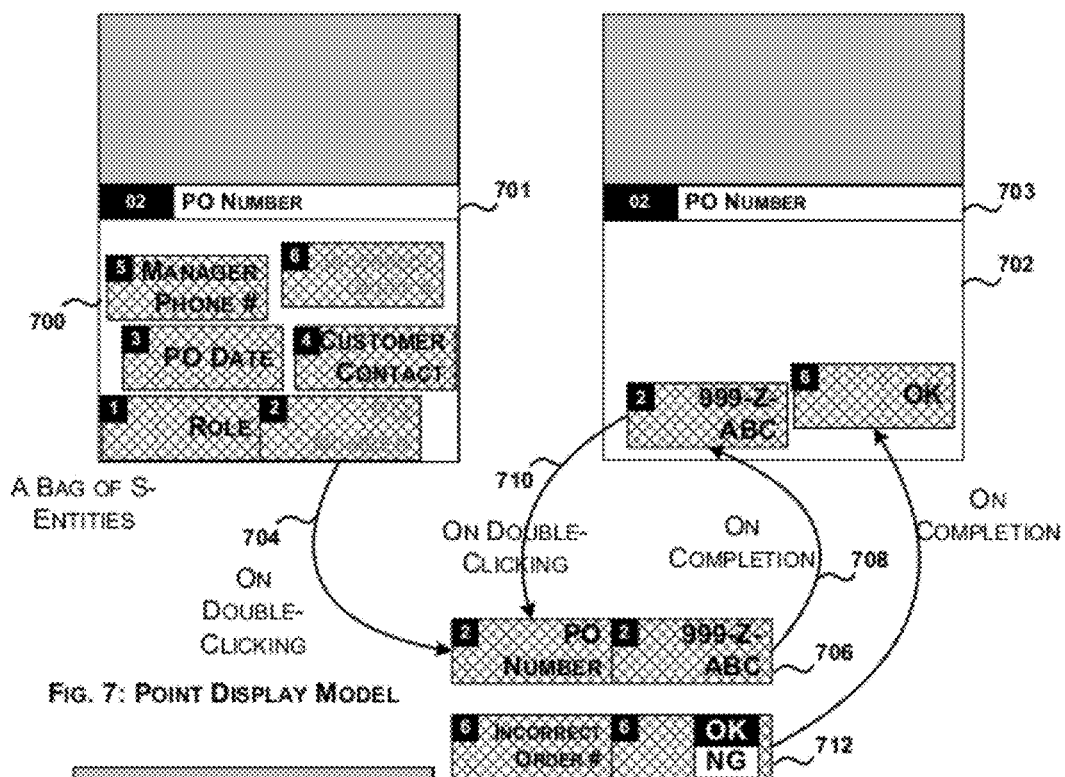
FIG. 7: POINT DISPLAY MODEL
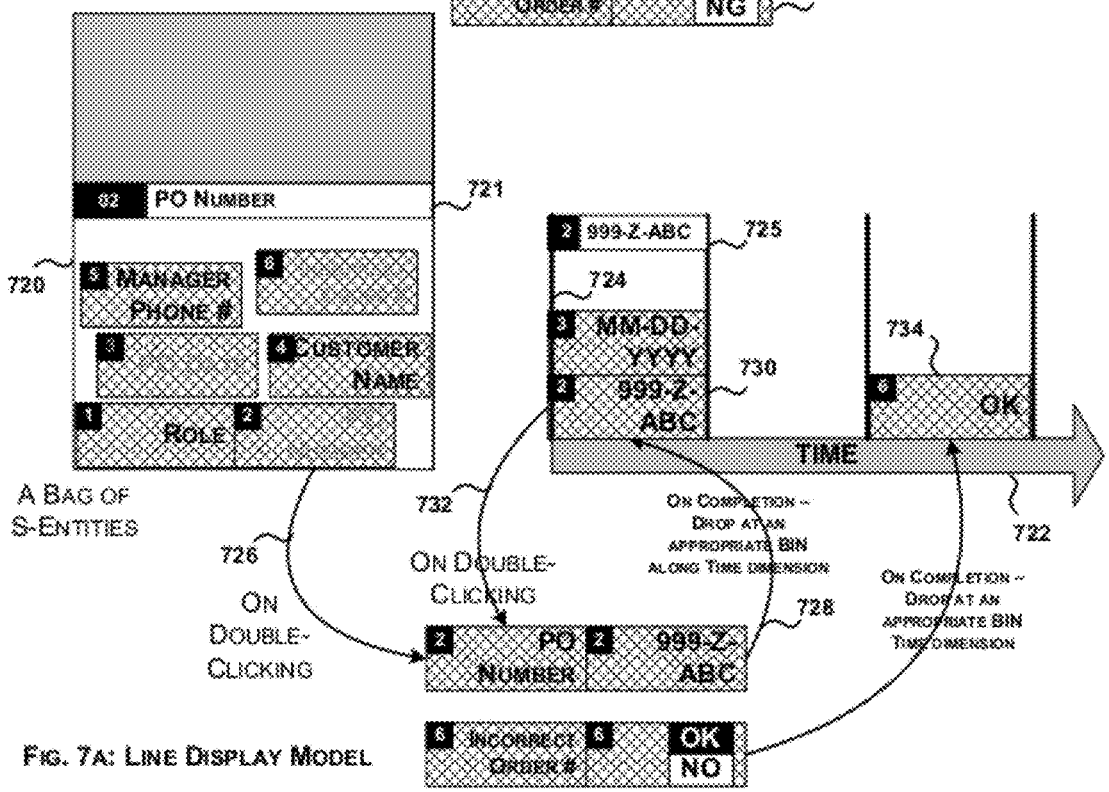
FIG. 7A: LINE DISPLAY MODEL

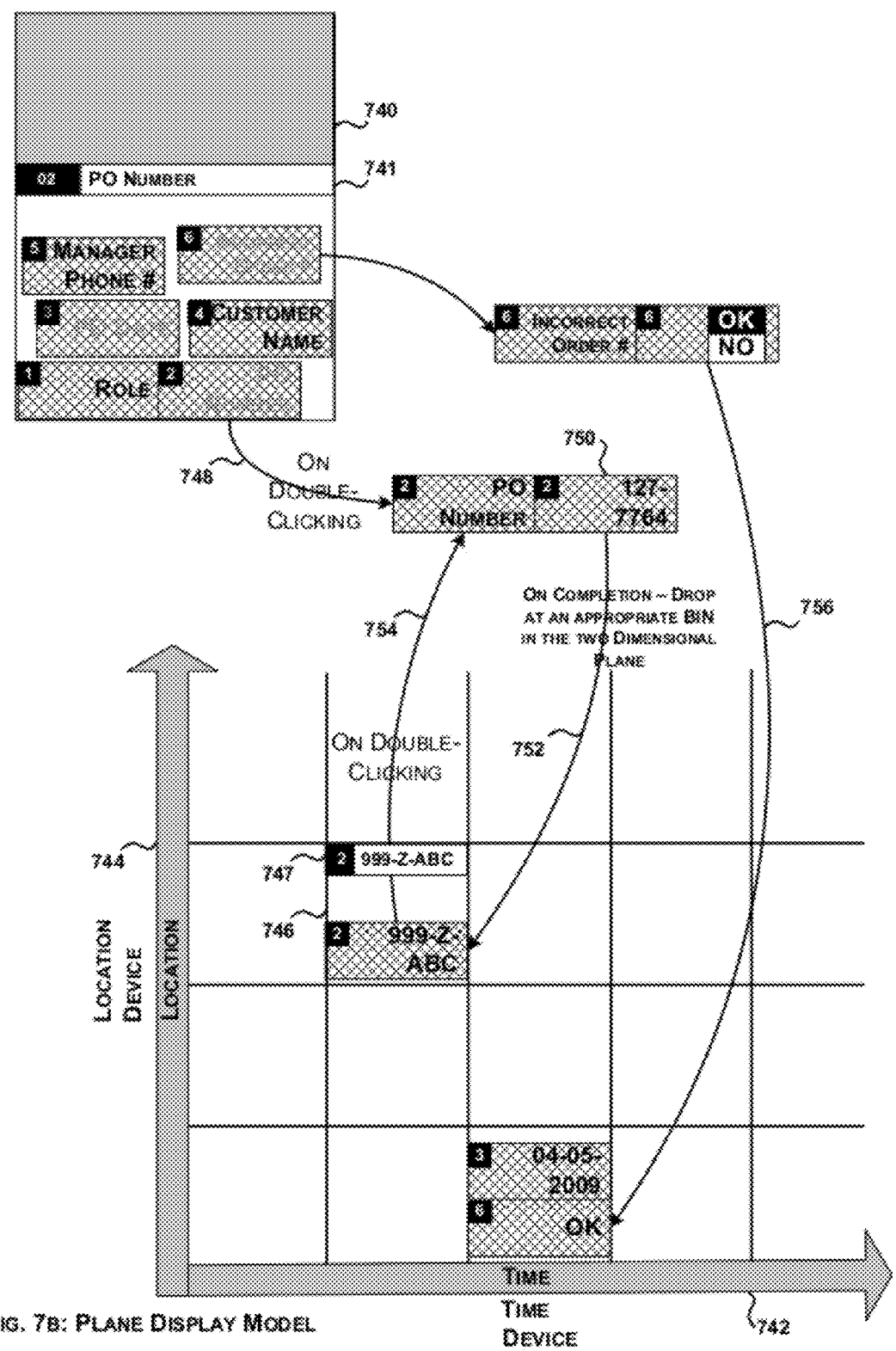
FIG. 7B: PLANE DISPLAY MODEL

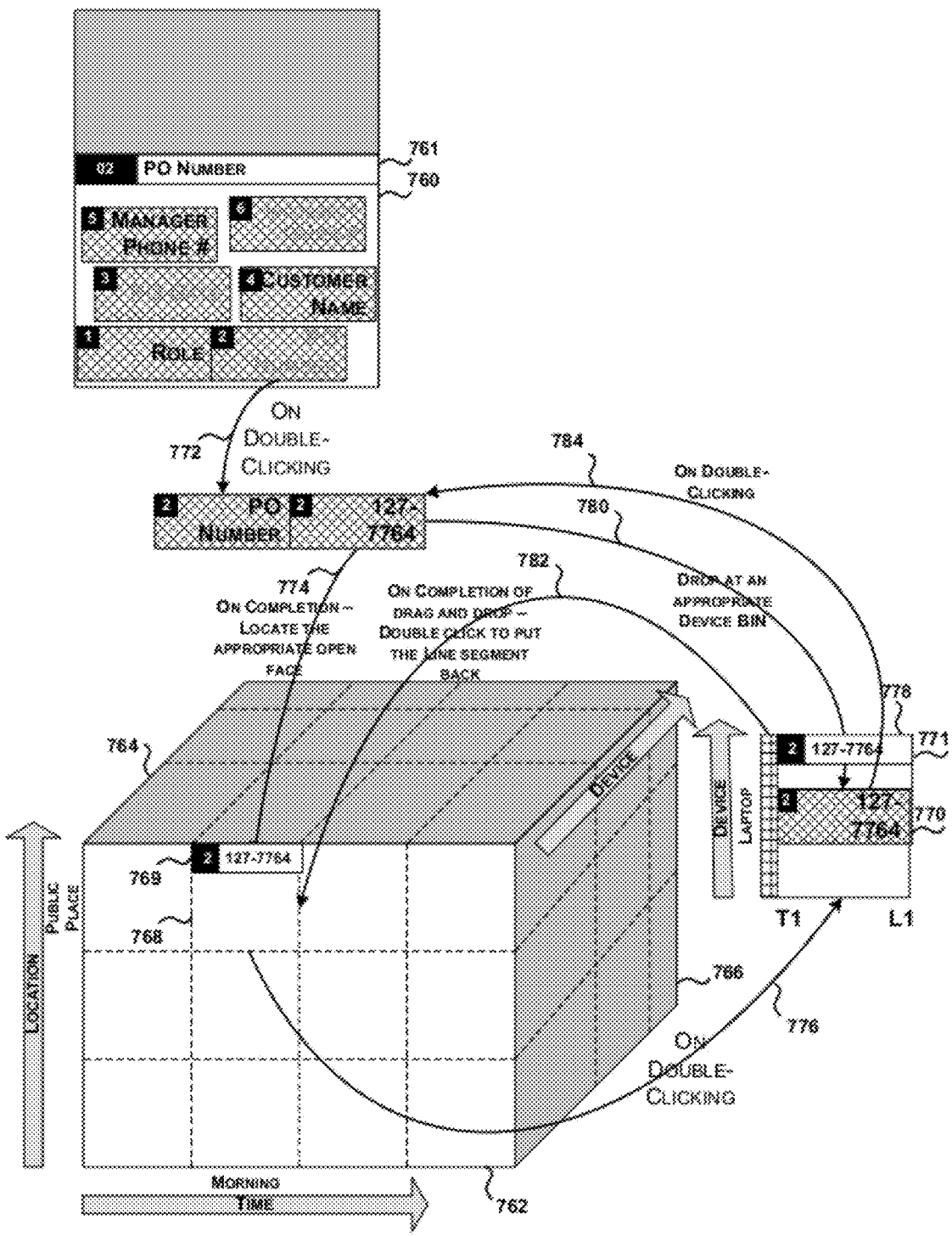
FIG. 7C: CUBE DISPLAY MODEL

CUBE VALIDATION

1. OBTAIN THE DISPLAY MODEL; OBTAIN THE DISPLAY SOURCE BAG;
   LET N BE THE NUMBER OF S-ENTITIES IN SOURCE BAG; LET S-ENTITY $E_i$ BE
   ASSOCIATED WITH WEIGHT $W_i$;

2. DISPLAY MODEL IS POINT:
2A. OBTAIN THE FILLED-IN BAG;
2B. FOR EACH S-ENTITY $E_i$ IN THE FILLED-IN BAG,
     IF THE RESPONSE IS CORRECT, THEN $O_i = 1$; ELSE $O_i = 0$;
2C. COMPUTE THE SUM $S = W_i * O_i$ OVER $1 <= i <= N$;
2D. IF S EXCEEDS A PRE-DEFINED THRESHOLD, RETURN OK; ELSE RETURN NOT-OK;

3. DISPLAY MODEL IS LINE:
3A. LET D BE THE RANDOMLY SELECTED LINE DIMENSIONALITY;
    NOTE THAT D COULD BE ONE OF TIME, LOCATION, OR DEVICE;
    OBTAIN THE FILLED-IN LINE;
3B. FOR EACH S-ENTITY $E_i$ IN THE FILLED-IN LINE,
     IF THE RESPONSE IS OK AND THE PLACEMENT WITH RESPECT TO LINE IS OK,
     THEN $O_i = 1$; ELSE $O_i = 0$;
3C. COMPUTE THE SUM $S = W_i * O_i$ OVER $1 <= i <= N$;
3D. IF S EXCEEDS A PRE-DEFINED THRESHOLD, RETURN OK; ELSE RETURN NOT-OK;

4. DISPLAY MODEL IS PLANE:
4A. LET <D1, D2> BE THE RANDOMLY SELECTED PLANE DIMENSIONALITY;
    NOTE THAT EACH OF D1 AND D2 COULD BE ONE OF TIME, LOCATION, OR DEVICE;
    OBTAIN THE FILLED-IN PLANE;
4B. FOR EACH S-ENTITY $E_i$ IN THE FILLED-IN PLANE,
     IF THE RESPONSE IS OK AND THE PLACEMENT WITH RESPECT TO PLANE IS OK,
     THEN $O_i = 1$; ELSE $O_i = 0$;
4C. COMPUTE THE SUM $S = W_i * O_i$ OVER $1 <= i <= N$;
4D. IF S EXCEEDS A PRE-DEFINED THRESHOLD, RETURN OK; ELSE RETURN NOT-OK;

5. DISPLAY MODEL IS CUBE:
5A. LET <D1, D2, D3> BE THE CUBE DIMENSIONALITY;
    NOTE THAT D1 IS TIME, D2 IS LOCATION, AND D3 IS DEVICE;
    OBTAIN THE FILLED-IN CUBE;
5B. FOR EACH S-ENTITY $E_i$ IN THE FILLED-IN CUBE,
     IF THE RESPONSE IS OK AND THE PLACEMENT WITH RESPECT TO CUBE IS OK,
     THEN $O_i = 1$; ELSE $O_i = 0$;
5C. COMPUTE THE SUM $S = W_i * O_i$ OVER $1 <= i <= N$;
5D. IF S EXCEEDS A PRE-DEFINED THRESHOLD, RETURN OK; ELSE RETURN NOT-OK;

FIG. 8: CUBE VALIDATION

SYSTEM AND METHOD FOR FLYING SQUAD RE AUTHENTICATION OF ENTERPRISE USERS

FIELD OF THE INVENTION

The present invention relates to authentication of users to grant access to applications/services/systems in general and more particularly to re-authentication. Still more particularly, the present invention is related to a system and method for on the fly re-authentication during a session based on a novel challenge-response technique.

BACKGROUND OF THE INVENTION

Identity management in an enterprise involves obtaining adequate information about a user of an enterprise system in order to establish the identity of the user. A typical way to achieve this is to use an authentication procedure, say, based on a user id and a password. In this case, each user of the system is provided with a unique user id and the users are requested to register the passwords of their choice with the system. In certain environments, the user id, password combination may become the weak link in the overall security aspects of the enterprise system. For example, the password could get stolen and misused. The additional responsibility of the identity management system is to ensure that no such fraudulent intrusions happen. One of the enhancements could be to exploit challenge-response technique, wherein on successful obtaining of the password from a user, the system poses one or more challenges, say in terms of questions, to the user. The access to the system is granted only upon the successful completion of this challenge-response duel. Observe that while, in principle, this enhances access security, this enhancement is also open to identity theft and insider related frauds. An interesting challenge-response system is based on what is called as Captcha: Captcha is a software program that can generate and grade tests that most humans can pass but current software programs can't pass. This is used to ensure that a web site is not systematically attacked by a software program generating unexpected results. Note that such a variation in challenge-response overcomes a particular limitation of a typical challenge-response.

The authentication schemes need to not only account for enhanced access security, but also to support single signon mechanisms. Single signon solutions aim at reducing the sign on overhead from the perspectives of users and enterprises. Various features that are expected from a single sign on solution include Security, Standards compliance (security), Multi-factor authentication, Interoperability, Easy deployment, Scalability, Intelligent learning, Service continuity, Service composition, Performance, Return on investment, and Enhanced user productivity. While single signon promises an easy and productive solution, the question of "degree of security" is highly debatable leading to the continuing threat for its wide adoption by enterprises. A system for supporting adequate security and flexibility for single signon systems involves a software program that can generate and grade tests that only a "real" user can pass and imposters can't pass.

DESCRIPTION OF RELATED ART

U.S. Pat. No. 7,496,755 to Genty; Denise Marie (Austin, Tex.), Mullen; Shawn Patrick (Buda, Tex.) for "Method and system for a single-sign-on operation providing grid access and network access" (issued on Feb. 24, 2009 and assigned to International Business Machines Corporation (Armonk, N.Y.)) describes a system for an integrated single-sign-on for network access and grid access based on a proxy certificate that includes the information such as a set of network access parameters.

U.S. Pat. No. 7,353,383 to Skingle; Bruce James (Cambridge, GB) for "System and method for single session sign-on with cryptography" (issued on Apr. 1, 2008 and assigned to JPMorgan Chase Bank, N.A. (New York, N.Y.)) describes a method and system for single session sign-on across multiple content servers using public/private key cryptography based on session certificates.

U.S. Pat. Application No. 20080159534 titled "Method to authenticate and accessory" by Rager; Kent D.; (Gurnee, Ill.); Hansen; Joseph M.; (Williams Bay, Wis.) (filed on Dec. 28, 2006 and assigned to Motorola Inc., (Libertyville, Ill.)) describes an apparatus used by a device to authenticate an accessory. The apparatus transmits a challenge to the accessory and receives a response, compares the received response to the stored response corresponding to the stored challenge sent to the accessory, and generates an appropriate authentication signal.

U.S. Pat. Application No. 20080005037 titled "Consumer authentication system and method" by Hammad; Ayman; (Pleasanton, Calif.); Faith; Patrick; (Pleasanton, Calif.) (filed on Jun. 14, 2007) describes a method for authenticating a consumer that includes receiving an authorization request message associated with the consumer conducting a transaction with a portable consumer device. A challenge message is sent to the consumer, where the challenge message is dynamic or semi-dynamic. A challenge response message is received from the consumer, and an authorization response message is sent to the consumer.

U.S. Pat. Application No. 20070294752 titled "Single sign on with proxy services" by Kinser; Stephen Hugh; (Saratoga Springs, Utah); Burch; Lloyd Leon; (Payson, Utah); Morris; Cameron Craig; (Saratoga Springs, Utah) (filed on Jun. 1, 2006 and assigned to Novell, Inc.) describes techniques for proxing services with a single sign on.

U.S. Pat. Application No. 20070277231 titled "Policy driven, credential delegation for single sign on and secure access to network resources" by Medvinsky; Gennady; (Redmond, Wash.); Ilac; Cristian; (Sammamish, Wash.); Hagiu; Costin; (Sammamish, Wash.); Parsons; John E.; (Sammamish, Wash.); Fathalla; Mohamed Emad El Din; (Sammamish, Wash.); Leach; Paul J.; (Seattle, Wash.); Kamel; Tarek Buhaa El-Din Mahmoud; (Issaquah, Wash.) (filed on May 26, 2006 and assigned to Microsoft Corporation (Redmond, Wash.)) describes a credential security support provider that enables any application to securely delegate a user's credentials from the client, via client side Security Support Provider software, to a target server, via server side Security Service Provider software in a networked computing environment.

"Single sign-on to the web with an EMV card" by Boyd, D. J. (appeared in Collaborative Technologies and Systems, 2008. CTS 2008. 9-23 May 2008) proposes a framework for single sign-on that meets the mentioned criteria by using an EMV card for two-factor authentication, without the card making physical contact with the network connected device, and without exposing the keys and PIN that are used to protect financial transactions.

"A Secure two-factor authentication scheme for single sign-on services" by Brasee, K., Makki, S. K., and Zeadally, S. (appeared in Security Comm. Networks. (2008), published online in Wiley InterScience, www.interscience.wiley.com) DOI: 10.1002/sec.36) describes a novel single sign-on (SSO)

scheme known as secure distributed SSO (SeDSSO). SeDSSO provides secure fault-tolerant authentication using threshold key encryption with a distributed authentication service.

"JSON Based Decentralized SSO Security Architecture in E-Commerce" by Jun, Y., Zhishu, L., and Yanyan, M. (appeared in International Symposium on Electronic Commerce and Security, 3-5 Aug. 2008 Page(s): 471-475 Digital Object Identifier 10.1109/ISECS.2008.171) describes a security model of JSON (JavaScript Object Notation) based on single sign-on architecture for Ecommerce enterprise. The presented decentralized single sign-on security architecture is easy to integrate with legacy system and new developed system.

The known systems do not address about how to prevent fraudulent intrusions in a challenge-response environment. The present invention provides for a system and method to overcome the limitations of the challenge-response authentication mechanism. The objective is to make the challenge-response a dynamically varying scheme so as to reduce the scope for identify thefts. Specifically, the challenge-response scheme is to be such that it is easy for the real user to pass while, at the same time, making it very difficult for the imposters to pass.

SUMMARY OF THE INVENTION

The primary objective of the invention is to re-authenticate a user to support single signon schemes.

One aspect of the invention is to select a set of s-entities from a set of field names, field values, and messages associated with each of a set of enterprise applications.

Another aspect of the invention is to instrument an enterprise application so as to display the entities from s-entities that are associated with the enterprise application in a highlighted manner.

Yet another aspect of the invention is to randomly select a subset of a set of s-entities with respect to a particular user.

Another aspect of the invention is to display in a highlighted manner a randomly selected s-entities based on the user-specific subset of s-entities associated with a logged in user and an enterprise application being interacted with by the logged in user.

Yet another aspect of the invention is to obtain a user-specific three-stamped field names, field values, and messages during the course of interactions with an enterprise application.

Another aspect of the invention is to re-authenticate an enterprise user during the course of a logged in session to support single signon.

Yet another aspect of the invention is to schedule multiple re-authentications of an enterprise user during the course of a logged in session.

Another aspect of the invention is to display a user-specific randomly selected three-stamped s-entities for obtaining the user response during the course of a logged in session of an enterprise-user.

Yet another aspect of the invention is to exploit the multi-dimensionality of the s-entities.

Another aspect of the invention is to consider Time dimension, Location dimension, and Device dimension as a part of the multiple dimensions of the s-entities.

Yet another aspect of the invention is to realize a point display model in which the three dimensions of a selected subset of s-entities are ignored.

Another aspect of the invention is to realize a line display model in which only one dimension of the three dimensions associated with a selected subset of s-entities is considered.

Yet another aspect of the invention is to realize a plane display model in which a pair of dimensions of the three dimensions associated with a selected subset of s-entities is considered.

Another aspect of the invention is to realize a cube display model in which all the three dimensions associated with a selected subset of s-entities are considered.

Yet another aspect of the invention is to validate the obtained user response.

BRIEF DESCRIPTION OF THE DRAWINGS

FIG. 1 provides an illustrative networking environment of Flying Squad re-Authentication (FSrA) System.

FIG. 2 provides an overview of FSrA System.

FIG. 2a depicts FSrA S-Entities and S-Dimensions.

FIG. 3 provides an approach for application-wise field selection.

FIG. 4 provides an approach for user-specific field selection.

FIG. 5 provides an approach for Re-Authentication Scheduling.

FIG. 5a depicts Illustrative Notations and Re-Authentication Time Computation.

FIG. 6 provides an overall re-authentication procedure.

FIG. 6a depicts Illustrative W3-Info, P3-Info, and M3-Info Tables.

FIG. 7 depicts an illustrative point display model.

FIG. 7a depicts an illustrative line display model.

FIG. 7b depicts an illustrative plane display model.

FIG. 7c depicts an illustrative cube display model.

FIG. 8: provides a procedure for cube validation.

DETAILED DESCRIPTION OF THE PREFERRED EMBODIMENTS

Distributed assets of an enterprise require secured access to these assets by the stakeholders of the enterprise. At the same time, the secured access should not be over constraining the users resulting in the overall reduced productivity. Hence, the need is to achieve a fine balance between ease of interactions and prevention of fraudulent interactions. Typically, the users of the enterprise interact with the enterprise information repository quite often to fulfill their role based responsibilities. A single signon ensures that the users need not have to sign on several times in order to interact with multiple front-end and back-end applications. In other words, in a particular scenario, a particular user signs in once, say in the morning, and interacts with the system using multiple devices such as a desktop, laptop, and mobile phone, and finally signs off in the evening.

In this scenario, an important need is to secure the session so as to prevent fraudulent interactions during the ongoing session. This is achieved by using a novel challenge-response duel that only a "real" user can win.

FIG. 1 provides an illustrative networking environment of Flying Squad re-Authentication (FSrA) System. 100 and 105 depict the distributed nature of enterprise resources across, say, two data centers. In order to support secured user interaction sessions, each such data center has FSrA system (110). This combination of multiple FSrA systems with the respective data centers provides secured access to users from an office (115), a public place (120), an airport lounge (125), home (130), or while on road (135) using multitude of devices such as a desktop (140), a laptop (145), and a smart phone (150). Note that these devices are used to interact with enterprise information resources through a network such as IP network (155).

FIG. 2 provides an overview of FSrA System. The FSrA system (200) has multiple subsystems and operates multiple databases to support automatic re-authentication of signed in users. In particular, there are two distinct databases: 205 contains information related to the various enterprise applications, their fields, and their message; 210 contains information related to users, their possible locations, and their possible devices for interactions. 215 depicts a subsystem to select a subset of fields associated with each application and to instrument each of the applications with respect to each of the selected subset of fields to decorate each of the fields when displayed and providing of the value of the fields on return from display to FSrA system. Here, decoration indicates the providing of visual cues for the users to notice and remember. 220 depicts a subsystem to randomly select one or more fields of the selected subset of fields of an application and instructing the instrumented application to decorate the randomly selected fields during display and providing of the value associated with the randomly selected field on return from display. 225 depicts a subsystem to record the field-application specific three-stamped field value in the database. Note that three stamps here refer to timestamp, location stamp, and device stamp. While the subsystem 215 is an offline activity, the subsystems 220 and 225 are performed routinely whenever an application is being interacted with. Similarly, the subsystems 230, 235, and 240 get executed in parallel. 230 depicts a subsystem to automatically schedule re-authenticate sessions: a session associated with a signed in user lasts for a substantial period of time, say, about eight hours; the scheduler automatically identifies the time period during the session to invoke the subsystems 235 and 240. The subsystem 235 displays a selected subset of three-stamped field values in a point, line, plane, or cube model while the subsystem 240 validates the cube data obtained from the user.

FIG. 2a depicts FSrA S-Entities and S-Dimensions. S-Entities are a subset of the entities of the enterprise system; and S-Dimensions are the multiple dimensions along with the values for S-Entities are obtaining during a session. 250 provides an overview of application and user related information. There are two types of applications: Work-flow related applications and Person related applications. Each application displays a certain fields and messages, and displays/obtains field values. A signed in user accesses one or more of the applications at a particular time, say, early morning, morning, evening, or late evening, from a particular location, say, office, home, or public place, using a particular device, say, desktop, laptop, or smart phone.

260 provides illustrative S-Entities. An application that is a part of the enterprise system is associated with multiple entities that get displayed for providing information to an enterprise user and obtaining of the information from the enterprise user. Typically, these fields are part of a form that gets displayed, some with initial value and some for obtaining appropriate value from the enterprise user. Some of these fields form part of S-Entities. Similarly, the application displays several messages and some of these messages are also part of S-Entities.

270 provides illustrative S-Dimensions. There are three specific dimensions of importance, namely, Time dimension, Location dimension, and Device dimension. Typical values for Time dimension are Early Morning, Morning, Evening, and Late Evening. Similarly, typical values for Location dimension includes Office, Home, and Public Place, and values for Device dimension include Desktop, Laptop, and Smart Phone.

FIG. 3 provides an approach for application-wise field selection. The enterprise system consists of multiple applications and the following steps are repeated for most of such applications. Note some of the applications get excluded either by design, by policy, or that it doesn't get selected in the random selection process. Select the various fields of the various applications (300). Applications are of two kinds: Work-Flow related Applications and Person related Applications (310). For each application, identify the fields (320): Fields are of two kinds: Name fields and Value fields; the field identification is based on criteria such as common-ness, importance, confidentiality, and numerical/non-numerical-ness. Instrument the application so as to display the identified fields in an appropriate manner, such as changing of fill color, font color, marking with special characters, for users to become aware of the fields when displayed (330). Update Fields Database to contain the various identified fields with respect to the several of the applications (340).

FIG. 4 provides an approach for user-specific field selection. The overall objective is to randomly select fields and messages, and associate the same with a user. Obtain the User-ID of the user (400). Analyze the access information associated with the User-ID to determine the most frequently accessed applications (410); note that the accessed applications are either work-flow related or person related applications. For each (A) of the most frequently accessed applications (work-flow related), obtain the set of fields from Fields Database (420). Randomly select a subset of fields from the set of fields of A and update Users Work-flow Fields database (430). Select a set of messages associated with A and select randomly a subset of messages; Update Users Messages database (440). For each (B) of the most frequently accessed applications (Person related), obtain the set of fields from Fields database (450). Randomly select a subset of fields from the set of fields of B and update Users Person Fields database (460). Select a set of messages associated with B and select randomly a subset of messages; Update Users Messages database (470).

FIG. 5 provides an approach for Re-Authentication Scheduling. The objective is to provide protection to an ongoing session so that no fraudulent session takeovers are possible. Consider a scenario in which an enterprise user has signed into the enterprise system and has initiated interactions with the system. During such a session, the FSrA system automatically ensures that there has not been an identity theft or insider frauds related activities with respect to this session. A novel way to achieve this is to provide for multiple surprise challenge-responses during the session in such a manner that only the "real" user can easily provide the response while imposters can't.

For a given user, Obtain User-ID; Obtain K past session durations: T1, T2, . . . , Tk (500). Determine the expected duration of the current session T(k+1) using T1, T2, . . . , Tk by performing a certain kind of time series analysis (510). Obtain Tm—the minimum duration between successive re-authentications; Tx—the maximum duration beyond which re-authentication cannot be delayed (520). Obtain R0—the time of the last re-authentication; Let Rc be the current time; Let R be start time of the session; Compute Ty as T(k+1)−(R0−R) and compute Tc as Rc−R (530). In the case when Tx>Tc: Generate a random number between Max(Tc, Tm) and Min(Tx, Ty) and assign to Tz; Schedule next re-authentication time as R0+Tz (540). On the other hand, if Tx<=Tc, schedule re-authentication immediately (550).

FIG. 5a provides illustrative notations and re-authentication time computation. 570 depicts a typical relationship among R0, Rc, Tc, Tm, Tz, Tx, and Ty pictorially. 580 provides an elaboration of the various notations and illustrates the computation of Tz.

Note that
- Ro: Time of last re-authentication;
- Rc: Current time;
- Tc: Elapsed time since last re-authentication;
- Tm: Minimum time to be elapsed for next re-authentication;
- Tx: Maximum elapsed time before which re-authentication should happen;
- Ty: Elapsed time by which the session is expected to end;
- Tz: Elapsed time before the scheduled next re-authentication;

and the typical Tz computation is as follows:

CASE Tm>Tc AND Ty>Tx:

Generate a random number between Tm and Tx to determine Tz;

CASE Tm<=Tc and Ty>Tx:

Generate a random number between Tc and Tx to determine Tz;

CASE Tm>Tc and Ty<=Tx:

Generate a random number between Tm and Ty to determine Tz;

CASE Tm<=Tc and Ty<=Tx:

Generate a random number between Tc and Ty to determine Tz

CASE Tx<=Tc:

Schedule re-authentication immediately;

FIG. 6 provides an overall re-authentication procedure.

Overall Re-Authentication Procedure

1. Instrument applications so that certain randomly selected fields get displayed highlighted; Note there are two kinds of applications: (a) Work-flow related; and (b) Person related;
2. During a session of a particular user, highlight a randomly selected user-specific fields and/or messages related to the application/System being interacted with; Obtain the user's response;
3. Store the highlighted field information: Name, Value, TimeStamp, LocationStamp, DeviceStamp; Associate a randomly generated TTL (Time to live) with each field information. Collect as much such information as possible during a session; Note that there are two kinds of information that gets highlighted while displayed on screen: (a) Field names and values; and (b) Messages;
4. This results in the populating of the following tables for each user: Table W containing W3-Info, Table P containing P3-Info, and Table M containing M3-Info. Note that Table W contains highlighted workflow-related three-stamped field names and values; Table P contains highlighted person-related three-stamped field names and values; and Table M contains highlighted application-related and system-related messages; additionally, Table M also contains an equal number of application-related and system-related messages that did not get displayed.
5. Determine the next re-authentication time point; Determine a random number Wr of W-Entities (within W-Min and W-Max bounds) and select Wr entities from Table W; Similarly, Determine a random number Pr of P-Entities (within P-Min and P-Max bounds) and select Pr entities from Table P; Determine a random number Mr of M-Entities (within M-Min and M-Max bounds) and select Mr entities from Table M; Note that S-Entities comprise of W-Entities, P-Entities, and M-Entities;
6. Randomly select a display model; Note that there are four kinds: Point Display model, Line Display model, Plane Display model, and Cube Display model;
7. Based on selected display model, Display Wr, Pr, and Mr entities, and Obtain the user feedback;
8. Evaluate the user feedback; Log the evaluation result; and Take an appropriate action such as allowing of the session to continue or aborting of the session.

FIG. 6a depicts illustrative W3-Info, P3-Info, and M3-Info Tables. 600 provides illustrative Table W highlighting the important information: Three-stamped info comprising time stamp, location stamp, and device stamp, and information related to field name and its associated value. Note that Table W contains information associated with workflow related applications. Similarly, 610 provides illustrative Table P containing three stamps, and field name and its associated value. Note that Table P contains information associated with person related applications. And, finally, Table M contains information related to application and system related messages along with three stamps (620).

FIG. 7 depicts an illustrative point display model. The objective of a display model is to display randomly selected information from three tables, namely, Table W, Table P, and Table M, in a manner to solicit feedback from the enterprise user in an interactive manner to help the "real" user to easily and effectively provide the requested information as part of the challenge-response interactions. There are four distinct kinds of display models: Point display model, Line display model, Plane display model, and Cube display model. Each of these models depict varied amount of information being obtained from the user during challenge-response interactions. For example, Point model indicates that S-Entities displayed as a collection need to be provided with the appropriate values. Note that S-Dimensions associated with S-Entities do not play any role in the interaction in Point display model. On the other hand, Line display model requires the S-Entities displayed as a collection to be related along a chosen dimension after providing the appropriate value. The chosen dimension can be one of Time, Location, or Device. Similarly, in Plane display model, the S-Entities are related along the chose two dimensions, namely, <Time, Location>, <Time, Device>, or <Location, Device>. And, finally, Cube display model relating each S-Entity in the three dimensional space, namely, <Time, Location, Device>.

FIG. 7 depicts Point display model. 700 indicates a bag of S-Entities; here, bag denotes that the dimensionality information associated with each of S-Entities is not being explicitly displayed. Recall that there are three dimensional values associated with each of the S-Entities: Time, Location, and Device, and the bag display these entities in a dimensionless form. Observe how a bag displays the S-Entities: Role, PO Number, PO Date, Customer Contact, Manager Phone #, and Incorrect Order #. Each of the entities is affixed with number: 1—Role, 2—PO Number, 3—PO Date, 4—Customer Contact, 5—Manager Phone #, and 6—Incorrect Order #. The displayed bag is a surprise challenge thrown at a user so as to ensure that only a "right" user is interacting with the system. On displaying a bag with numbered S-Entities, the user is expected to provide value for each of the displayed S-Entities and put them to the destination bag (702). In order to facilitate this, on double clicking (704) of an entity in the source bag (700), the entity is explicitly displayed out of the bag along with a paired value entity (706). Alternatively, a list box (701)

is provided to interactively select an S-entity of one's choice. The user fills in an appropriate value in the paired box, and double clicks on the paired box. On this completion indication (708), the paired box is pushed to the destination bag, and at the same time the S-Entity in the source bag is grayed or removed. If the user needs to change the provided value in the paired box, the same can be double clicked (710) to obtain the explicit display for correction. Alternatively, a list box (703) is provided to interactively select an S-entity of one's choice from the destination bag. In the case of an S-Entity being a message, the paired box displays OK and NG suggesting the user to select OK if the message had indeed been displayed during the ongoing session and NG otherwise. Note that in the Point display model, the user is expected to provide the appropriate values for the displayed S-Entities. This is the simplest of the display models.

FIG. 7a depicts an illustrative line display model. The line display models adds the first dimension of complexity: In this case, the user is displayed with a source bag (720) and an an S-Dimension, say, Time (722). The user is expected to provide not only the value for each of the S-Entities, but also arrange them as per the chosen S-Dimension, say, Time. Note that the chosen dimension is divided into multiple bins (724), each standing for a value along the dimension: in the case of Time dimension, illustrative values are Early Morning, Morning, Evening, and Late Evening. As in Point display model, the user double clicks (726) on an S-Entity to obtain an explicit display along with a paired box. The user provides an appropriate value in the paired box and on completion (728), drags and drops the paired box onto an appropriate bin along the line (730). Alternatively, a list box (721) is provided to interactively select an S-entity of one's choice. The user could correct the provided value by double clicking on the paired box (732). Alternatively, a list box (725) is provided to interactively select an S-entity of one's choice from a bin of the destination line. Similarly, OK or NG value is provided for a message entity (734).

FIG. 7b depicts an illustrative Plane display model. In this display model, the user is expected to distribute the S-Entities in the source bag (740) onto bins that are distributed on a two-dimensional plane. As an illustration, one of the dimensions is Time (742) and the other dimension is Location (744). Note that there are other two possibilities: <Time, Device> and <Device, Location> as the possible dimension pairs for defining a two dimensional plane. Each of the dimensions is divided into multiple segments: For example, Time dimension is divided into four segments, namely, Early Morning, Morning, Evening, and Late Evening; and Location dimension into three segments, namely, Office, Home, Public Place. A bin in the two dimensional plane is defined based on the segment intersections: For example, 746 defines a bin with co-ordinate values set as <Morning, Public Place>. The initial display consists of a source bag (740) consisting of a select number of S-Entities. Double clicking on an S-Entity (748), say, 2—PO Number, opens up an explicit display of the S-Entity along with a paired value entity (750). The user fills in an appropriate value in the paired box, and on completion (752), drags and drop the paired box onto an appropriate bin (752). Alternatively, a list box (741) is provided to interactively select an S-entity of one's choice. The user could correct the provided value by double clicking on the paired box (754). Alternatively, a list box (747) is provided to interactively select an S-entity of one's choice from a bin of the destination plane. Similarly, OK or NG value is provided for a message entity (756).

FIG. 7c depicts an illustrative Cube display model. This model requires the user to provide the response to a challenge in terms of all of the three dimensions, namely, Time, Location, and Device. In other words, the user is expected not only to provide the value for an S-Entity in the source bag (760), but also place the S-Entity with respect to the three dimensions. This forms the basis for calling the display model is Cube display model. In this model, on posing of a challenge to obtain the response, two objects get displayed: one is the source bag (760), and the second is the cube. This displayed cube comprises of three explicitly displayed dimensions, namely, Time, Location, and Device. In the three dimensional cube display, three faces of the cube are completely visible: The face 762 exhibits Time and Location dimensions explicitly; similarly, the face 764 exhibits Time and Device dimensions, and the face 766 exhibits Device and Location dimensions. Each of these dimensions is divided into segments: Time dimension into Early Morning, Morning, Evening, and Late Evening segments; Location dimension into Office, Home, and Public Place segments; and finally, Device dimension into Desktop, Laptop, and Smart Phone segments. On account of these segments, any point with three dimensional values can be located easily by navigating through a square of an open face of a cube. As an illustration, consider the open face (762) of the cube; there totally 12 squares on this face of the cube; The square (768) houses all points with co-ordinate values along the Time dimension as "Morning" and Location dimension as "Public Place." In order to determine the point with the co-ordinate value along Device dimension as "Laptop," this square is expanded along the Device dimension in a manner similar to the opening of a drawer of a cupboard. For example, 770 depicts a point <Morning, Public Place, Laptop>.

Double clicking on an S-Entity, say, 2—PO Number, opens up an explicit display of the S-Entity along with a paired value entity (772). Alternatively, a list box (741) is provided to interactively select an S-entity of one's choice. The user fills in an appropriate value in the paired box, and on completion (774), an appropriate open face of a cube is located (762). On double clicking on the appropriate square 768 with co-ordinate values <Morning, Public Place> (776), a column depicting the third dimension, namely, Device, gets displayed (778). This column is divided into multiple bins based on the possible values along Device dimension. As example, there are three bins (778), namely, Desktop, Laptop, and Smart Phone. On completion of providing of the value, the user drops the paired box onto an appropriate bin in the displayed column (780). And finally, on completion of drag and drop, double click on the left margin portion to the displayed column to put this back into the square 768 (782). This is similar to shutting back of the open drawer. The user could correct the provided value by double clicking on the paired box (784). Alternatively, a list box (771) is provided to interactively select an S-entity of one's choice from a bin of the displayed line.

FIG. 8 provides a procedure for cube validation.

CUBE Validation

1. Obtain the display model; Obtain the display Source Bag; Let N be the number of S-Entities in Source Bag; Let S-Entity Ei be associated with weight Wi;
2. Display model is POINT:
2a. Obtain the Filled-in Bag;
2b. For each S-Entity Ei in the Filled-in Bag,
    If the response is correct, then Oi=1; Else Oi=0;
2c. Compute the sum $S=Wi*Oi$ over $1<=I<=N$;
2d. If S exceeds a pre-defined threshold, RETURN OK; Else RETURN NOT-OK;

3. Display model is LINE:
3a. Let D be the randomly selected line dimensionality; Note that D could be one of Time, Location, or Device; Obtain the filled-in Line;
3b. For each S-Entity Ei in the Filled-in Line,
If the response is OK and the placement with respect to Line is OK,
Then Oi=1; Else Oi=0;
3c. Compute the sum S=Wi*Oi over 1<=I<=N;
3d. If S exceeds a pre-defined threshold, RETURN OK; Else RETURN NOT-OK;
4. Display model is PLANE:
4a. Let <D1, D2> be the randomly selected plane dimensionality;
Note that each of D1 and D2 could be one of Time, Location, or Device;
Obtain the filled-in Plane;
4b. For each S-Entity Ei in the Filled-in Plane,
If the response is OK and the placement with respect to Plane is OK,
Then Oi=1; Else Oi=0;
4c. Compute the sum S=Wi*Oi over 1<=I<=N;
4d. If S exceeds a pre-defined threshold, RETURN OK; Else RETURN NOT-OK;
5. Display model is CUBE:
5a. Let <D1, D2, D3> be the cube dimensionality;
Note that D1 is Time, D2 is Location, and D3 is Device;
Obtain the filled-in Cube;
5b. For each S-Entity Ei in the Filled-in Cube,
If the response is OK and the placement with respect to Cube is OK,
Then Oi=1; Else Oi=0;
5c. Compute the sum S=Wi*Oi over 1<=I<=N;
5d. If S exceeds a pre-defined threshold, RETURN OK; Else RETURN NOT-OK;

Thus, a system and method for flying squad (on the fly) re-authentication is disclosed. Although the present invention has been described particularly with reference to the figures, it will be apparent to one of the ordinary skill in the art that present invention may appear in any number of systems that need to support secured sessions for interacting with enterprise systems. It is further contemplated that many changes and modifications may be made by one of ordinary skill in the art without departing from the spirit and scope of the present invention.

What is claimed is:

1. A method for re-authenticating a user of an enterprise system during a session to support a single signon mechanism at a plurality of scheduled re-authentication times and to send an authentication message to said enterprise system, wherein said enterprise system is associated with a plurality of applications, said method comprising:

selecting a plurality of name fields associated with said plurality of applications, wherein said selection is based on a plurality of fields associated with said plurality of applications, and a plurality of properties associated with a field of said plurality fields comprising commonness, importance, confidentiality, and numerical-ness;

selecting a plurality of value fields associated with said plurality of applications, wherein aid selection is based on said plurality of fields, and a plurality of properties associated with a field of said plurality of fields;

selecting a plurality of messages comprising a plurality of application messages associated with said plurality of applications and a plurality of system messages, wherein said selection is based on a plurality of application messages associated with said plurality of applications, and a plurality of properties associated with a message of said plurality applications;

instrumenting of said plurality of applications so as to display said plurality of name fields, said plurality of value fields, and said plurality of messages in a manner so as to draw the attention of said user during the interactions with said applications during said session;

randomly selecting a plurality of user specific name fields based on said plurality of name fields and a plurality of most accessed applications of said plurality of applications, wherein a most accessed application of said plurality of most accessed applications is most frequently accessed by said user;

randomly selecting of a plurality of user specific value fields based on said plurality of value fields and said plurality of most accessed applications;

randomly selecting of a plurality of user specific messages based on said plurality of messages and said plurality of most accessed applications;

updating of a w3-info table, a p3-info table, and a m3-info table based on interactions of said user during said session;

re-authentication scheduling based on a last re-authentication time (R0) and a current time (Rc) to determine an elapsed time before next re-authentication (Tz), wherein said Tz is a part of said plurality of scheduled re-authentication times;

identifying a plurality of w3-entities randomly based on said w3-info table, wherein a time to live value of each of said plurality of w-entities exceeds zero;

identifying a plurality of p3-entities based on said p3-info table, wherein a time to live value of each of said plurality of p-entities exceeds zero;

identifying a plurality of m3-entities based on said m3-info table, wherein a time to live value of each of said plurality of m-entities exceeds zero;

selecting a random number of w-entities from said plurality of w3-entities;

making said random number of w-entities as a plurality of entities of a source bag;

selecting a random number of p-entities from said plurality of p3-entities;

making said random number of p-entities as a plurality of entities of said source bag;

selecting a random number of m-entities from said plurality of m3-entities;

making said random number of m-entities as a plurality of entities of said source bag;

point displaying said source bag and a destination bag, wherein as many of a plurality of entities of said source bag get displayed;

point filling in said destination bag based on said source bag and a plurality of responses provided by said user;

point re-authenticating said user based on said destination bag generating said authentication message;

line displaying said source bag and a destination line, wherein said destination line comprises of a plurality of line bins;

line filling in said destination line based on said source bag and a plurality of responses provided by said user;

line re-authenticating said user based on said destination line generating said authentication message;

plane displaying said source bag and a destination plane, wherein said destination plane comprises of a plurality of plane bins;

plane filling in said destination line based on said source bag and a plurality of responses provided by said user;

plane re-authenticating said user based on said destination plane generating said authentication message;

cube displaying said source bag and a destination cube, wherein said destination cube comprises of a plurality of cube bins and is based on a cube dimensionality comprising of time, location, and device;

cube filling in said destination line based on said source bag and a plurality of responses provided by said user; and cube re-authenticating said user based on said destination cube generating said authentication message.

2. The method of claim 1, wherein said step of updating further comprising:

obtaining an application of said plurality of most accessed applications being interacted with by said user, wherein said application is of type workflow-related application;

randomly highlighting a plurality of name fields and a plurality of value fields based on said plurality of user specific name fields and said plurality user specific value fields;

obtaining of a field value provided by said user for a name field of said plurality of name fields;

obtaining of said name field of said field value displayed by said application;

obtaining of a time stamp association with the interaction with said application based on the time of the interaction;

obtaining of a location stamp associated with the interaction with said application based on the access network used in the interaction;

obtaining of a device stamp associated with the interaction with said application based on the device used in the interaction;

forming of a of a three-stamped field-value based on said name field, said field value, said time stamp, said location stamp, said device stamp;

determining of a time to live value to be associated with said three-stamped field-value; and adding of said three-stamped field value along with said time to live value to said w3-info table.

3. The method of claim 2, wherein said step of updating further comprising:

obtaining an application of said plurality of most accessed applications being interacted with by said user, wherein said application is of type person-related application;

randomly highlighting a plurality of name fields and a plurality of value fields based on said plurality of user specific name fields and said plurality user specific value fields;

obtaining of a field value provided by said user for a name field of said plurality of name fields;

obtaining of said name field of said field value displayed by said application;

obtaining of a time stamp association with the interaction with said application based on the time of the interaction;

obtaining of a location stamp associated with the interaction with said application based on the access network used in the interaction;

obtaining of a device stamp associated with the interaction with said application based on the device used in the interaction;

forming of a three-stamped field-value based on said name field, said field value, said time stamp, said location stamp, said device stamp;

determining of a time to live value to be associated with said three-stamped field-value; and adding of said thee-stamped field value along with said time to live value to said p3-info table.

4. The method of claim 2, wherein said step of updating further comprising obtaining an application of said plurality of most accessed applications being interacted with by said user;

obtaining of an application specific message of said application displayed during the interaction by said user during said session based on said plurality of user specific messages;

obtaining of a time stamp association with the interaction with said application based on the time of the interaction;

obtaining of a location stamp associated with the interaction with said application based on the access network used in the interaction;

obtaining of a device stamp associated with the interaction with said application based on the device used in the interaction;

forming of a three-stamped field-value based on said application specific message, said time stamp, said location stamp, said device stamp;

determining of a time to live value to be associated with said three-stamped field-value; and adding of said thee-stamped field value along with said time to live value to said m3-info table.

5. The method of claim 2, wherein said step of updating further comprising obtaining of a system specific message displayed during the interaction by said user during said session based on said plurality of user specific messages;

obtaining of a time stamp association with the interaction with said application based on the time of the interaction;

obtaining of a location stamp associated with the interaction with said application based on the access network used in the interaction;

obtaining of a device stamp associated with the interaction with said application based on the device used in the interaction;

forming of a three-stamped field-value based on said system specific message, said time stamp, said location stamp, said device stamp;

determining of a time to live value to be associated with said three-stamped field-value; and adding of said thee-stamped field value along with said time to live value to said m3-info table.

6. The method of claim 2, wherein said step of updating further comprising:

obtaining a plurality of application specific messages associated with said plurality of applications;

selecting a plurality of selected application specific messages based on said plurality of application specific messages;

determining of a plurality of time to live values to be associated with said plurality of selected application specific messages; and making of said plurality of selected application specific messages along with said plurality of time to live values a part of said m3-info table.

7. The method of claim 2, wherein said step of updating further comprising:

obtaining a plurality of system specific messages;

selecting of a plurality of selected system specific messages based on said plurality of system specific messages;

determining of a plurality of time to live values to be associated with said plurality of selected system specific message; and making of said plurality of selected system specific messages along with said plurality of time to live values a part of said m3-info table.

8. The method of claim 1, wherein said step of re-authentication scheduling further comprising:

determining an elapsed time since last re-authentication (Tc) based on said Ro and said Rc;

determining a minimum time to be elapsed for next re-authentication (Tm);

determining of an elapsed time by which the session is expected to end (Ty);

ensuring that said Tm>said Tc and said Ty>said Tx; and generating a random number between Tm and Tx to determine said Tz.

9. The method of claim 8, wherein said step of re-authentication scheduling further comprising:

ensuring that said Tm<=said Tc and said Ty>Tx; and generating a random number between said Tc and said Tx to determine said Tz.

10. The method of claim 8, wherein said step of re-authentication scheduling further comprising:

ensuring that said Tm>said Tc and said Ty<=said Tx; and generating a random number between said Tm and said Ty to determine said Tz.

11. The method of claim 8, wherein said step of re-authentication scheduling further comprising:

ensuring that said Tm<=said Tc and said Ty<=Tx; and generating a random number between said Tc and said Ty to determine said Tz.

12. The method of claim 8, wherein said step of re-authentication scheduling further comprising:

ensuring that said Tx<=said Tc; and setting zero to said Tz.

13. The method of claim 1, wherein said step of point filling in further comprising:

allowing of said user to select an entity from said source bag by double clicking on said entity;

displaying of said entity along with a blank box to obtain a value for said entity, wherein said blank box contains two pre-defined values OK and NG if said entity is an m-entity from said m3-info table;

accepting said value provided by said user for said entity as a response; and making said response along with said entity a part of a response of said plurality of responses;

allowing said user to move said response along with said entity to said destination bag; and removing said entity from said source bag.

14. The method of claim 13, wherein said step of point filling in further comprising:

allowing of said user to select an entity from a list box associated with said source bag based on the identification number associated with said entity.

15. The method of claim 13, wherein said step of point filling in further comprising:

allowing said user to select an entity from said destination bag by double clicking on said entity or using a list box associated with said destination bag based on an identification number associated with said entity;

displaying said entity along with a box containing a value associated with said entity;

removing said entity from said destination bag;

accepting said value provided by said user for said entity as a response;

making said response along with said entity a part of a response of said plurality of responses; and allowing said user to move said response along with said entity to said destination bag.

16. The method of claim 1, wherein said step of point re-authenticating further comprising:

obtaining an entity from said destination bag;

obtaining a three-stamped field-value associated with said entity;

assigning of value 1 to an output if the response associated with said entity is correct with respect to the value associated with said entity based on said three-stamped field-value;

assigning of value 0 to said output if the response associated with said entity is incorrect with respect to the value associated with said entity based on said three-stamped field-value;

making of said output a part of a plurality of outputs;

obtaining of a plurality of weights associated with a plurality of entities of said destination bag;

computing a sum based on said plurality outputs and said plurality of weights;

assigning OK to said authentication message if said sum exceeds a pre-defined value; and assigning NG to said authentication message if said sum does not exceed said pre-defined value.

17. The method of claim 1, wherein said step of line displaying further comprises:

randomly selecting a line dimensionality based on time, location, and device; and displaying said plurality of line bins of said destination line with respect to said line dimensionality.

18. The method of claim 1, wherein said step of line filling in further comprising:

allowing said user to select an entity from said source bag by double clicking on said entity;

displaying said entity along with a blank box to obtain a value for said entity, wherein said blank box contains two pre-defined values OK and NG if said entity is an m-entity from said m3-info table;

accepting said value provided by said user for said entity as a response;

making said response along with said entity a part of a response of said plurality of responses;

allowing said user to move said response along with said entity to a line bin of said plurality of line bins selected by said user; and removing said entity from said source bag.

19. The method of claim 18, wherein said step of line filling in further comprising:

allowing said user to select an entity from a list box associated with said source bag based on the identification number associated with said entity.

20. The method of claim 18, wherein said step of line filling in further comprising:

allowing said user to select an entity from a line bin of said plurality of line bins by double clicking on said entity or using a list box associated with said line bin based on an identification number associated with said entity;

displaying said entity along with a box containing a value associated with said entity;

removing said entity from said line bin;

accepting said value provided by said user for said entity as a response;

making said response along with said entity a part of a response of said plurality of responses; and allowing said user to move said response along with said entity to a line bin of said plurality of line bins selected by said user.

21. The method of claim 1, wherein said step of line re-authenticating further comprising:
   obtaining of an entity from a line bin of said plurality of line bins;
   obtaining a three-stamped field-value associated with said entity;
   assigning of value 1 to an output if the response associated with said entity is correct with respect to the value associated with said entity and a dimensional value associated with said line bin based on said three-stamped field-value;
   assigning of value 0 to said output if the response associated with said entity is incorrect with respect to the value associated with said entity and a dimensional value associated with said line bin based on said three-stamped field-value;
   making of said output a part of a plurality of outputs;
   obtaining of a plurality of weights associated with a plurality of entities of said destination line;
   computing a sum based on said plurality outputs and said plurality of weights;
   assigning OK to said authentication message if said sum exceeds a pre-defined value; and
   assigning NG to said authentication message if said sum does not exceed said pre-defined value.

22. The method of claim 1, wherein said step of plane displaying further comprises:
   randomly selecting a plane dimensionality, wherein said plane dimensionality is a pair of dimensional values based on time, location, and device; and
   displaying said plurality of plane bins of said destination plane with respect to said plane dimensionality.

23. The method of claim 1, wherein said step of plane filling in further comprising:
   allowing said user to select an entity from said source bag by double clicking on said entity;
   displaying said entity along with a blank box to obtain a value for said entity, wherein said blank box contains two pre-defined values OK and NG if said entity is an m-entity from said m3-info table;
   accepting said value provided by said user for said entity as a response;
   making said response along with said entity a part of a response of said plurality of responses;
   allowing said user to move said response along with said entity to a plane bin of said plurality of plane bins selected by said user; and
   removing said entity from said source bag.

24. The method of claim 23, wherein said step of plane filling in further comprising:
   allowing said user to select an entity from a list box associated with said source bag based on the identification number associated with said entity.

25. The method of claim 23, wherein said step of plane filling in further comprising:
   allowing said user to select an entity from a plane bin of said plurality of plane bins by double clicking on said entity or using a list box associated with said plane bin based on an identification number associated with said entity;
   displaying said entity along with a box containing a value associated with said entity;
   removing said entity from said plane bin;
   accepting said value provided by said user for said entity as a response;
   making said response along with said entity a part of a response of said plurality of responses; and
   allowing of said user to move said response along with said entity to a plane bin of said plurality of plane bins selected by said user.

26. The method of claim 1, wherein said step of plane re-authenticating further comprising:
   obtaining an entity from a plane bin of said plurality of plane bins;
   obtaining a three-stamped field-value associated with said entity;
   assigning value 1 to an output if the response associated with said entity is correct with respect to the value associated with said entity and a pair of dimensional values associated with said plane bin based on said three-stamped field-value;
   assigning value 0 to said output if the response associated with said entity is incorrect with respect to the value associated with said entity and a pair of dimensional values associated said plane bin based on said three-stamped field-value;
   making said output a part of a plurality of outputs;
   obtaining a plurality of weights associated with a plurality of entities of said destination plane;
   computing a sum based on said plurality outputs and said plurality of weights;
   assigning OK to said authentication message if said sum exceeds a pre-defined value; and
   assigning NG to said authentication message if said sum does not exceed said pre-defined value.

27. The method of claim 1, wherein said step of cube filling in further comprising:
   allowing said user to select an entity from said source bag by double clicking on said entity;
   displaying said entity along with a blank box to obtain a value for said entity, wherein said blank box contains two pre-defined values OK and NG if sand entity is an m-entity from said m3-info table;
   accepting said value provided by said user for said entity as a response;
   making said response along with said entity a part of a response of said plurality of responses;
   allowing said user to double click on a cube bin of said plurality of cube bins to display to a plurality of line bins;
   allowing of said user to move said response along with said entity to a line bin of said plurality of line bins selected by said user;
   allowing of said user to double click on said plurality of line bins to remove the display of said plurality of line bins; and
   removing said entity from said source bag.

28. The method of claim 27, wherein said step of cube filling in further comprising:
   allowing said user to select an entity from a list box associated with said source bag based on the identification number associated with said entity.

29. The method of claim 27, wherein said step of cube filling in further comprising:
   allowing said user to select an entity from a cube bin of said plurality of cube bins by double clicking on said entity or using a list box associated with said cube bin based on an identification number associated with said entity;
   allowing said user to select said entity from said cube bin by double clicking on said cube bin resulting in a display of a plurality of line bins, and double clicking on said entity that is a part of a line bin of said plurality of line bins or using a list box associated said plurality of line bins;

displaying said entity along with a box containing a value associated with said entity;

removing said entity from said cube bin;

accepting said value provided by said user for said entity as a response; and making said response along with said entity a part of a response of said plurality of responses;

allowing said user to double click on a cube bin of said plurality of cube bins to display to a plurality of line bins;

allowing said user to move said response along with said entity to a line bin of said plurality of line bins selected by said user; and allowing said user to double click on said plurality of line bins to remove the display of said plurality of line bins.

30. The method of claim 1, wherein said step of cube re-authenticating further comprising:

obtaining an entity from a cube bin of said plurality of cube bins;

obtaining of a three-stamped field-value associated with said entity;

assigning of value 1 to an output if the response associated with said entity is correct with respect to the value associated with said entity and a three dimensional value associated with said cube bin based on said three-stamped field-value;

assigning of value 0 to said output if the response associated with said entity is incorrect with respect to the value associated with said entity and a three dimensional value associated with said cube bin based on said three-stamped field-value;

making of said output a part of a plurality of outputs;

obtaining of a plurality of weights associated with a plurality of entities of said destination cube;

computing a sum based on said plurality outputs and said plurality of weights;

assigning OK to said authentication message if said sum exceeds a pre-defined value; and assigning NG to said authentication message if said sum does not exceed said pre-defined value.

* * * * *